INVENTOR.
William J. V. Toman

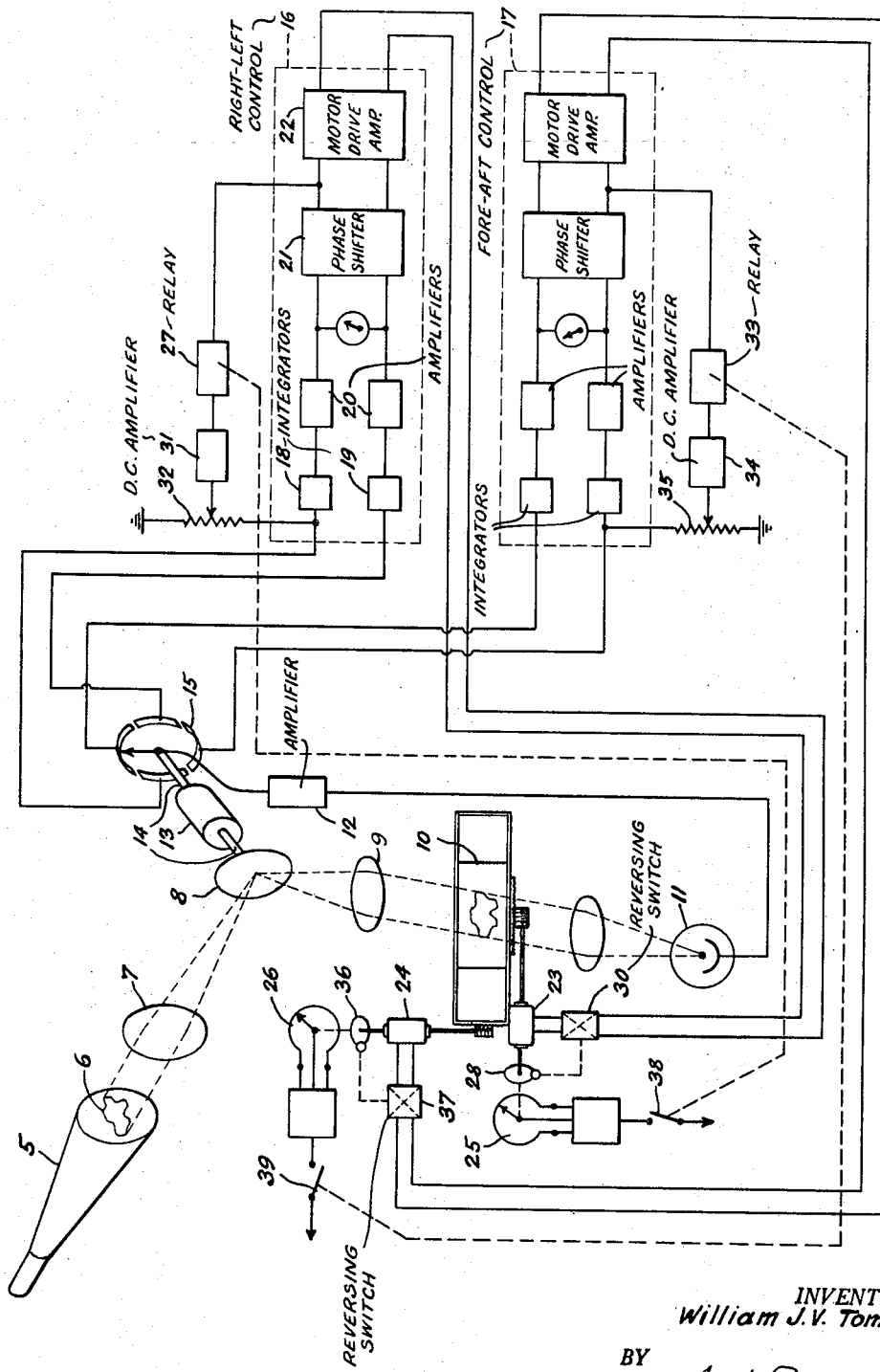

United States Patent Office 3,374,968
Patented Mar. 26, 1968

3,374,968
AUTOMATIC SCANNING AND LOCK-IN APPARATUS FOR A MECHANICAL OPTICAL SYSTEM USED IN NAVIGATIONAL CONTROL
William J. V. Toman, Cuyahoga Falls, Ohio, assignor to Goodyear Aerospace Corporation, a corporation of Delaware
Filed July 21, 1951, Ser. No. 237,985
13 Claims. (Cl. 244—3.17)

This invention relates to apparatus for guiding and/or indicating the relative position of aircraft or the like, and, more particularly, is concerned with an apparatus for obtaining and maintaining a continuous match between a radar display image of the terrain over which the aircraft is flying and a reference map of the same area, using the difference of level of transmitted light between conditions of "no-match" and "full-match" to occasion the transfer from an automatic wide range scan function to that of a lock-in and continuous matching function.

It has been proposed heretofore in the allowed patent applications of Meneley and Langworthy, Ser. No. 66,048, now Patent No. 3,193,822, filed Dec. 18, 1948, and Carl A. Meneley, Ser. No. 234,602, filed June 30, 1951, now Patent No. 3,226,058, to provide guidance for a pilotless aircraft or the like by the automatic comparison of a radar display image of the terrain over which the aircraft is flying with stored reference information in the form of an opposite contrast reference map transparency having substantially the same scale and orientation as the radar display image. While the apparatus described in the above-identified application is effective in maintaining a match between the image and the map, the apparatus has the serious limitation that unless the error of mismatch is relatively small, the apparatus is unable to achieve control of the aircraft. As a result of this limitation, the map and instantaneous display image must be near the match point before the described automatic navigation system can take over control of the aircraft.

It is the general object of this invention to avoid and overcome this and other limitations and objections to the prior art practices and to provide an improved, fast-working, and sensitive apparatus for automatically guiding and/or indicating the relative position of either piloted or pilotless aircraft or the like in flight that is capable of bringing the aircraft on course from a comparatively large deviation from the true course.

Another object of this invention is to provide apparatus for effecting a wide range scanning movement of the display image relative to the entire area of the map until a substantial match therebetween results and then to automatically lock in automatic means to maintain an exact match between the map and display image to indicate the position and guide and maintain the aircraft on course.

Another object of this invention is to provide a means which is sensitive to the relative displacement error between the map and the projected radar display image whereby transition between the function of automatic wide range scanning and the function of lock-in and match seeking occur automatically as the displacement between the map and the projected radar image passes in an out of a predetermined displacement error range.

The foregoing objects of this invention, and other objects which will become apparent as the description proceeds, are achieved by providing in combination means such as a radar screen, for producing a substantially instantaneous display of the terrain over which the aircraft is flying, means for directing an image of the radar display against a mirror, an opposite contrast reference map in the form of a transparency of the terrain over which the aircraft is flying and to the same scale and orientation, and positioned so that the display image is reflected by the mirror against the map, a photocell positioned behind the map, motor means for rotating the mirror, the mirror being mounted at a slight angle from the perpendicular to the axis of the motor shaft to provide circular scanning movement between the reference map and the display image as the mirror is rotated, commutating means having four segments and rotated with the mirror for successively switching the output signal through each of the segments from the photocell, motor and drive means operated from and responsive to the difference in the photocell output signal of one pair of opposed segments of the commutator and adapted to move the map in a fore or aft direction, motor and drive means operated from and responsive to the difference in the photocell output signal of the other pair of opposed segments of the commutator and adapted to move the map in a right or left direction, relay means responsive to the voltage signal on the opposed commutator segments associated with the fore and aft motor and drive means, separate relay means responsive to the voltage signal on the opposed commutator segments associated with the right and left motor and drive means, the relay means connecting the motors and associated drive means to a large constant voltage signal simulating a high degree of mismatch, the relays being energized when the commutator output signal is above a predetermined voltage level regardless of variations therein above this level, and cam-operated limit switches associated with the map and adapted to reverse the motors at the limits of travel of the map whereby a broad scanning movement is imparted to the map automatically when the matching error is in excess of the predetermined amount.

For a better understanding of the invention, reference should be had to the accompanying drawings, wherein:

FIG. 3 is a diagrammatic illustration of the apparatus of the invention.

If an image made up of light and dark areas, such as the image of terrain over which an aircraft is flying produced as a display on a plan position indicator (PPI) tube by radar means, is projected onto a negative of the image in the form of a transparency, such as a reference map of the terrain, provided the scale and orientation of the projected image and its negative are substantially the same, the amount of light passing through the negative from the projected image source continuously varies as the image and its negative are moved relative to each other. This phenomenon, of course, is the obvious result of variations in light and dark areas in the images and their relative alignment. It will be appreciated that, when the projected image is in exact match with the negative, the amount of light received from the projected image source which passes through the negative is substantially zero, the light areas of the positive image falling exactly on the dark areas of the negative. The amount of light transmitted from the projected image source through the negative varies continuously as the overlapping areas of dark and light keep changing. These variations in light level, indicated at 2, 3, and 4, which are hereinafter referred to as spurious matches, are considerably smaller than the change that takes place at the true match point 1. This is illustrated graphically in FIG. 1, which is typical of the variations in light level, plotted on the Z-axis, with deviation from the match point of the display image and reference map in either the X or Y direction. It is evident that at the true match point, the light level falls to a minimum well below the level of the spurious match points.

Figure 1:
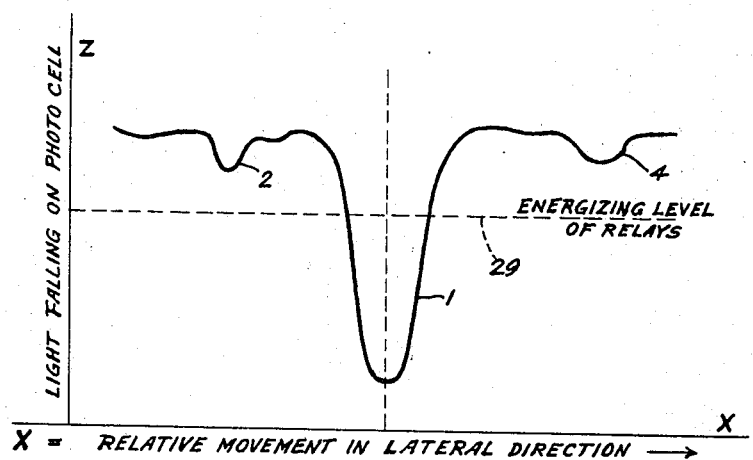
FIGS. 1 and 2 are graphical representations of the variations in transmitted light falling on the photocell as the reference map is moved in a lateral or fore-aft direction respectively relative to the display image.
Figure 2:
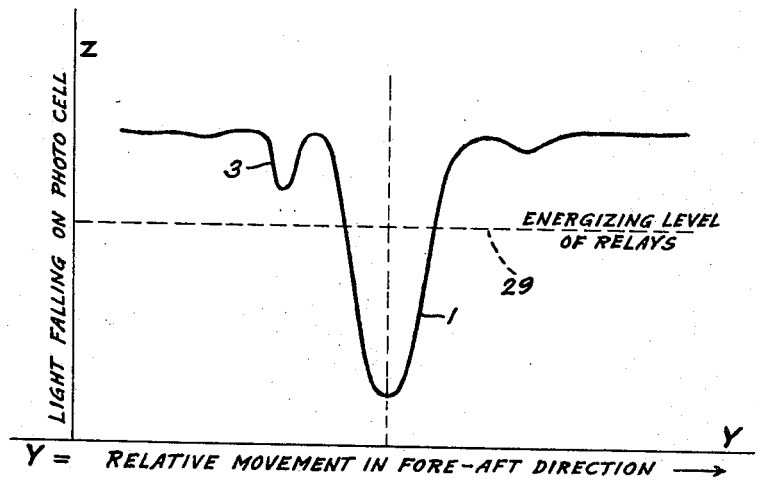

Apparatus for using the type of information indicated by FIGS. 1 and 2 is illustrated in FIG. 3, wherein the numeral 5 indicates the plan position indicator (PPI) tube for producing a substantially instantaneous radar picture or display of the terrain over which the aircraft is flying. The display 6 produced on the tube 5 is directed by a lens 7 against a mirror 8, from which it is reflected through a condensing lens 9 onto the plane of a reference map 10, the map 10 being preferably an opposite contrast transparency having substantially the same scale and orientation as the projected display image. By opposite contrast, it will be understood that if, for example, the display 6 is positive, then the map 10 is negative, or vice versa. However, the map need not be of opposite contrast, that is, a negative of the radar display image. Match between a positive map and image can be used as well, the match point then being characterized by maximum light transmission. The reference map 10 may be made from actual radar photographs obtained by flying a similar radar installation over the area before the aircraft flight, or may be made by other methods, such as the utilization of an ultrasonic radar trainer operating over a built-up model of the terrain over which the aircraft is in flight. The map 10 covers a considerably larger area than that represented by the radar display 6.

Light from the projected display image passing through the map 10 is directed onto a photocell or other light sensitive means 11. A suitable amplifier 12 amplifies the output signal of the photocell 11 to a usable level.

The mirror 8 is mounted on the shaft 14 of a motor 13, the plane of the mirror being tipped slightly from the perpendicular with respect to the axis of the rotating shaft of the motor. This imparts a wobble to the plane of the mirror as it is rotated by the motor, which in turn causes the reflected image to scan in a small circular motion in the plane of the reference map 10. This narrow range systematic movement between the reference map and display image, hereinafter referred to as nutation of the display image, is an essential feature of the navigational system in maintaining a match between the map and image by introducing a directional sense to any displacement error therebetween. It will become evident as the description proceeds that, when a condition of match occurs between the radar display 6 and the reference map 10, the projected image of the radar display is actually continuously displaced from the position of match with the reference map by virtue of the wobble movement of the mirror 8.

Associated with the motor shaft 14 is a commutator 15. The commutator 15 preferably has four segments which are successively connected to the output of the amplifier 12, two opposed segments being connected to a right-left motor control circuit indicated generally at 16, and the remaining two opposed segments being connected to a fore-aft motor control circuit indicated generally at 17.

The motor control circuits 16 and 17 are identical in their component parts and operations. Therefore, for the sake of brevity and clarity, only the motor control circuit 16 will be described in detail.

As nutation of the display image takes place around the match point, variations in the transmitted light are picked up by the photocell 11 and amplified through the amplifier 12 and applied to the commutator 15. The amplified output is commutated synchronously with the mirror into fore-aft, and right-left components by proper phasing of the commutator with the nutation of the display image. The right-left components, for example, are applied through integrating networks 18 and 19 to obtain steady output voltages proportional to the chopped signals derived from the commutator.

Thus, as the projected display image is nutated, variations in the light transmission through the reference map 10 result in a difference in potential between the output of the integrating circuit 18 and integrating circuit 19. It will be appreciated that this difference in potential is in effect an error voltage which is a measure of the displacement error from an exact match between the radar display 6 and the reference map 10.

This error potential is amplified by the indicator-amplifiers 20 and applied to a phase shifter circuit 21, which is of the type disclosed in the patent application of Robert G. Wilson, Ser. No. 227,511, filed May 21, 1951, now Patent No. 3,226,057. The phase shifter can be any one of a number of circuits known in the art that produce an alternating voltage output signal which is reversed in phase depending on the relative polarity of the D.C. input to either lag or lead an alternating reference voltage. The phase shifter circuit 21 varies the amplitude of the output signal in proportion to the error signal produced by the difference in potential between the output signal of the integrating circuits 18 and 19.

The output voltage of the phase shifter 21 is applied through a phase-sensitive motor drive amplifier 22, together with the reference voltage, to a two-phase motor 23. The direction of rotation of the motor 23 is determined by the phase relationship of the two-phase output voltage signal of the phase-sensitive motor drive amplifier 22, while the speed of rotation is determined by the amplitude thereof.

In a similar manner, the motor control circuit 17 utilizes a D.C. error signal which is indicative of the sense and magnitude of the mismatch in the fore-aft direction and converts it into an alternating current variation raised to a power level adequate to control the speed and direction of rotation of the two-phase fore-aft motor 24.

The motor 23 is associated with suitable means for moving the map 10 in a right or left direction the proper amount necessary to keep the reference map lined up or matched laterally with the radar display image. Similarly, the fore-aft motor 24 is associated with the map 10 to effect movement of the map 10 in a fore-aft direction the proper amount necessary to keep the map lined up or matched with the radar display 6. While such arrangement is only shown diagrammatically in FIG. 2, means for obtaining universal motion in one plane, such as that imparted to the map 10, is well known in the art and details thereof form no part of this invention.

The position and movement of the map 10 in a right or left direction, for example, is a measure of the lateral deviation from the intended flight path and is utilized to indicate the off-course position of the aircraft and/or to control the aircraft through the autopilot to bring it back on course. This is achieved in the form of the invention illustrated by means of a potentiometer 25 which is operated simultaneously with the movement of the map in a lateral direction by the motor 23. The potentiometer 25 provides an electrical measure of the position and movement of the map 10, which information can be applied to appropriate indicating instruments and/or the aircraft autopilot control (not shown). Similarly, the potentiometer 26, coupled to the fore-aft motor 24, is used in conjunction with appropriate indicating instruments to obtain a measure of range.

One of the important features of this invention is a lock-in control system which imparts an automatic back-and-forth scanning motion to the map 10 in both the fore-aft and lateral directions until the projected display image and negative map 10 pass a point of substantial match. This function is achieved in the following manner.

To effect wide range scanning motion in the right-left or lateral direction, for example, a relay 27 is provided by means of which a large A.C. voltage signal is applied to the input of the phase-sensitive motor drive amplifier 22 of such magnitude as to override and overpower any output signal of the phase shifter 21. Thus, with the external A.C. voltage applied to the motor drive amplifier 22, the motor 23 moves the map in a lateral direction independently of any error signals derived from the light falling on the photo-cell 11. A cam-operated limit switch 28, associated with the lateral motor 23, limits the scanning movement of the map 10 to the desired limits of scan by actuating a double-pole, double-throw relay 30 as the map 10 reaches the end of its traverse. The cam switch, when tripped, actuates the double-pole, double-throw relay and reverses the direction of rotation of the motor 23.

The relay 27 is preferably arranged so that when it becomes energized, the simulated A.C. error voltage is disconnected from the input of the motor drive amplifier so that the phase shifter signal can regain control. The relay is energized by means of a D.C. amplifier 31, the input voltage of which is derived from the input to the integrating circuit 18. By adjusting potentiometer 32 on the input of the D.C. amplifier, the lock-in control can be adjusted so that the relay is energized when the light level on the photocell 11 drops below a level encountered in the normal range of spurious matches. The energizing level is indicated at 29 in FIG. 1.

In a similar manner, a lock-in control is provided for automatic wide range scan of the map in a fore-aft direction including a relay 33 energized by means of D.C. amplifier 34 from an input signal taken across the potentiometer 35 connected to the input of one of the integrating circuits associated with the fore-aft motor control circuit 17. The relay 33 applies an automatic wide range scanning control to the fore-aft motor 24 in the manner as above described in connection with the lateral motor 23. A cam switch 36 limits the movement of the map 10 by means of a double-pole, double-throw relay 37 to the desired scanning limits.

In operation, assuming an initial mismatch between the projected image and the negative contrast map 10, the level of light reaching the phototube 11, despite spurious matches resulting in variations in this level of light, is such that the light levels are above the energizing level 29, as indicated in FIG. 1, so that the voltage signals at the input of the lock-in control amplifiers 31 and 34 are not sufficient to actuate the relays 27 and 33. The relays 27 and 33 not being energized, a large A.C. signal voltage is thereby effected across the input to the motor drive amplifiers so that the motors 23 and 24 are driven at constant speed. By making one motor run at a higher speed than the other, for example, by a difference in amplitude in the fixed voltages applied to the input of the motor drive amplifiers by the relays 27 and 33 or by suitable gearing, the projected display image effectively scans over the whole area of the negative contrast reference map 10. During the scanning process, as the true match point is approached, the level of light drops off and, in doing so, drops below the energizing level 29, FIG. 1, which allows the relays 27 and 33 to become energized, thereby locking-in the match-seeking signal introduced by nutation of the display image. Thus, the automatic scan continues until a substantial match between the projected image and the reference map 10 is effected, at which time the lock-in control stops the automatic scan and permits the error signal derived from the commutated signals to take control in the manner above described.

During the automatic wide range scan operation, it is desirable that the information derived from the potentiometers 25 and 26 be disconnected from the autopilot. This is accomplished by relay-operated switches 38 and 39, which are closed by the relays 27 and 33 respectively as soon as the lock-in and match is achieved between the projected image of the display 6 and the reference map 10. After the switches 38 and 39 are closed the information derived from the potentiometers 25 and 26 is fed to the indicating instruments or the autopilot system to maintain the aircraft on course.

From the above description, it will be appreciated that the objects of the invention have been achieved by a provision of a navigational apparatus which automatically finds the position of the plane relative to the intended course of the plane over premapped terrain by providing an automatic wide range scanning of the reference map 10 relative to the projected display image of the terrain as derived from the radar system. When the two maps are sufficiently matched in either the lateral and/or the fore-aft dimension so that the transmitted light drops below a predetermined level, automatic wide range scanning is interrupted and the navigational system locks-in and takes over control of the aircraft to bring it on course and automatically navigate the aircraft over the predetermined course.

While certain representative embodiments and details have been shown for the purpose of illustrating the invention, it will be apparent to those skilled in this art that various changes and modifications may be made therein without departing from the spirit or scope of the invention.

What is claimed is:

1. In an apparatus for controlling the flight of aircraft or the like, means for producing a substantially instantaneous image of the terrain over which the aircraft is flying, a previously prepared map of the terrain across which the desired course of the airplane passes, said map and image having the same scale and orientation, means for projecting the image onto the map, light responsive means adapted to respond to the light passing through the map from the projected image for indicating a match therebetween, motor means associated with the contrast map for moving the map in the plane of the map surface, nutating means for moving the projected image in a small rapid circular motion across the surface of the map, four integrating networks, commutator means associated with said nutating means successively connecting the light responsive means to each of the integrating networks as the projected image completes one circular movement, two phase-shifting means associated with the integrating networks and each responsive to the difference in output potential of a separate pair of alternate integrating networks, said phase-shifting means being operatively associated with said motor means and adapted to control the direction and speed of said motor means in response to the polarity and magnitude of the potential difference applied to said phase shifter means, said motor means moving the map relative to the projected image to bring the map and projected image into substantial match and thereby to reduce the potential difference on the input of said phase-shifting means to substantially zero, amplifier means associated with the output of two successive integrating networks, relay means controlled by the output of each of said amplifier means and responsive to the absolute amplitude of the output potential of the associated integrating network, said relay means connecting an A.C. voltage across the output of said phase-shifting means, said relay means being actuated to disconnect said A.C. voltage when the light level on the light sensitive means drops below a predetermined level, and limit switches associated with said motor means for reversing said motor means at the limits of travel of the map whereby automatic wide range scanning movement is imparted to the map when the light sensitive means indicates a substantial mismatch between the map and projected image.

2. In an apparatus for controlling the flight of aircraft or the like, means for producing a substantially instantaneous image of the terrain over which the aircraft is flying, a previously prepared contrast map of the terrain across which the desired course of the airplane passes, said map and image having the same scale and orientation, means for projecting the image onto the map, light responsive means adapted to respond to the light passing through the map from the projected image for indicating a match therebetween, motor means associated with the contrast map for moving the map in the plane of the map surface, nutating means for moving the projected image in a small rapid circular motion across the surface of the map, four integrating networks, commutator means associated with said nutating means for successively connecting the light responsive means to each of the integrating networks as the projected image completes one circular movement, a pair of motor control means associated with the integrating networks and each responsive to the difference in output potential of a separate pair of alternate integrating networks, said motor control means being operatively associated with said motor means and adapted to control the direction and speed of said motor means in response to the polarity and magnitude of the potential difference applied to the input of said motor control means, said motor means moving the map relative to the projected image to bring the map and projected image into a substantial match condition and thereby to reduce the potential difference on the input of said motor control means to zero, amplifier means associated with the output of two successive integrating networks, relay means controlled by the output of each of said amplifier means and responsive to the absolute amplitude of the output potential of the associated integrating network, said relay means connecting an A.C. voltage across the output of said phase shifting means, said relay means being actuated to disconnect said A.C. voltage when the light level on the light sensitive means drops below a predetermined level, and limit switches associated with said motor means for reversing said motor means at the limits of travel of the map whereby automatic wide range scanning movement is imparted to the map when the light sensitive means indicates a substantial mismatch condition between the map and projected image.

3. In an apparatus for controlling the flight of aircraft or the like, means for producing a substantially instantaneous image of the terrain over which the aircraft is flying, a previously prepared reference map of the terrain across which the desired course of the airplane passes, said map and image having the same scale and orientation, means for projecting the image onto the map, light responsive means adapted to respond to the light passing through the map from the projected image for indicating a match condition therebetween, motor means associated with the reference map for moving the map in the plane of the map surface, means for moving the projected image in a small rapid circular motion across the surface of the map, four integrating networks, commutator means associated with said means for successively connecting the light responsive means to each of the integrating networks as the projected image passes through one complete circular movement, a pair of motor control means associated with the integrating networks and each responsive to the difference in output potential of a separate pair of alternate integrating networks, said motor control means being operatively associated with said motor means and adapted to control the direction and speed of said motor means in response to the polarity and magnitude of the potential difference applied to the input of said motor control means, said motor means moving the map relative to the projected image to bring the map and projected image into substantial match condition and thereby to reduce the potential difference on the input of said motor control means to zero, relay means controlled by the output of the successive integrating networks, said relay means being responsive to the absolute amplitude of the output potential of the associated integrating network, said relay means connecting an A.C. voltage across the output of said phase shifting means, and limit switches associated with said motor means for reversing said motor means at the limits of travel of the map whereby automatic wide range scanning movement is imparted to the map when the light sensitive means indicates a substantial mismatch condition between the map and projected image.

4. In an apparatus for controlling the flight of aircraft or the like, means for producing a substantial instantaneous image of the terrain over which the aircraft is flying, a previously prepared map of the terrain across which the desired course of the airplane passes, said map and image having the same scale and orientation, means for projecting the image onto the map, light responsive means adapted to respond to the light passing through the map from the image for indicating a match therebetween, motor means associated with the map for moving the map in the plane of the map surface, error measuring means associated with said light sensitive means, motor control means responsive to said error measuring means for moving the map relative to the projected image for maintaining a substantial match condition therebetween, amplifier means responsive to the output of said light sensitive means, relay means actuated by said amplifier means when the level of the light falling on the light sensitive means drops below a predetermined level, said relay means normally connecting said motor means to a fixed voltage source for operating said motor means at a constant speed when said light level is in excess of said predetermined level, and limit switches associated with said motor means for reversing said motor means at the limits of travel of the map whereby automatic wide range scanning movement is imparted to the map when the light sensitive means indicates a substantial mismatch condition between the map and projected image.

5. In an apparatus for controlling the flight of aircraft or the like, means for producing a substantially instantaneous image of the terrain over which the aircraft is flying, a previously prepared contrast map of the terrain across which the desired course of the airplane passes, said map and image having the same scale and orientation, means for projecting the image onto the map, light responsive means adapted to respond to the light passing through the map from the projected image for indicating a match condition therebetween, motor means associated with the contrast map for moving the map in the plane of the map surface, error measuring means associated with said light sensitive means, motor control means responsive to said error measuring means for moving the map relative to the projected image for maintaining a substantial match condition therebetween, relay means for initiating automatic wide range scanning movement to the map when the light sensitive means indicates a substantial mismatch, said relay means being actuated by variations in the output potential of said light sensitive means, and limit switches associated with said motor means for reversing said motor means at the limits of travel of the map whereby automatic scanning movement is imparted to the map when the light sensitive means indicates a substantial mismatch condition between the map and projected image.

6. In an apparatus for controlling the flight of aircraft or the like, means for producing a substantially instantaneous image of the terrain over which the aircraft is flying, a previously prepared opposite contrast map of the terrain across which the desired course of the airplane passes, said map and image having the same scale and orientation, means for projecting the image onto the map, light responsive means adapted to respond to the light passing through the map from the projected image for indicating a match condition therebetween, motor means associated with the contrast map for moving the map in the plane of the map surface, error measuring means associated with said light sensitive means, motor control means responsive to said error measuring means for moving the map relative to the projected image and for maintaining a substantial match condition therebetween, and means for initiating automatic wide range scanning movement to the map when the light sensitive means indicates a substantial mismatch, said means being actuated by variations in the output potential of said light sensitive means.

7. Automatic navigation apparatus including means for producing an instantaneous image of the terrain being navigated, a map of the terrain to be navigated, optical means superimposing said map and image, worm, wormgear and motor means for effecting a wide range of relative scanning movement between the map and image, means moving a part of the optical means for effecting nutation between the map and image, means responsive to a substantial match between the map and image for cutting off the operation of the wide range scanning means, said responsive means cutting back in the operation of the wide range scanning means if the match between the map and image is substantially lost, potentiometer means movable in response to the positioning of the map and adapted to provide fore-aft and right-left error signals, and switch means disconnecting the error signals when the wide range scanning means are operating.

8. Automatic navigation apparatus including means for producing an instantaneous image of the terrain being navigated, a contrast map of the terrain to be navigated, means superimposing said map and image, means for effecting a wide range of relative scanning movement between the map and image, means for effecting a narrow range of relative scanning movement between the map and image, means responsive to a substantial match between the map and image for cutting off the operation of the wide range scanning means, and means operative upon the cutting off of the wide range scanning means for controlling the direction of flight in response to the position of the map when substantially matched with the image.

9. Automatic navigation apparatus including means for continuously producing an image of the terrain being navigated, a contrast map of the terrain to be navigated, means for superimposing said map and image, means for effecting a wide range of relative scanning movement between the map and image, means for effecting a narrow range of relative scanning movement between the map and image, means responsive to a substantial match between the map and image for cutting off the operation of the wide range scanning means, and means for controlling the navigational path in response to the position of the map when substantially matched with the image.

10. Automatic navigation apparatus including means for producing a substantially instantaneous image of the terrain being navigated, a contrast map of the terrain to be navigated, said map and image being optically superimposed, means for effecting a wide range of relative scanning movement between the map and image, separate means for effecting a narrow range of relative scanning movement between the map and image, and means responsive to a substantial match between the map and image for cutting off the operation of the wide range scanning means but allowing the operation of the narrow range scanning means to continue, said responsive means cutting back in the operation of the wide range scanning means if the match between the map and image is substantially lost.

11. Automatic navigation apparatus including means for producing a substantially instantaneous image of the terrain being navigated, an opposite contrast map of the terrain to be navigated, said map and image being to the same scale and orientation and being optically superimposed, means for effecting a wide range of relative scanning movement between the map and image, separate means for effecting nutation between the map and image, and means responsive to a substantial match between the map and image for cutting off only the operation of the wide range scanning means.

12. In combination, means for producing an image of a relatively large area of terrain, a map of the terrain, means for superimposing the map and image, means for effecting a wide range of relative scanning movement between the map and image for seeking a substantial match therebetween, separate means for effecting a narrow range of relative scanning movement between the map and image for maintaining a continuous match therebetween, and means responsive to a match between the map and image whether effected by the wide range scanning means or the narrow range scanning means.

13. In combination, means for producing an actual image of a relatively large area of terrain, a map of the terrain to substantially the same scale and orientation, means for effecting a wide range of relative scanning movement between the map and image for seeking a substantial match therebetween, separate means for effecting a narrow range of relative scanning movement between the map and image for maintaining a continuous match therebetween, and means responsive to a substantial match between the map and image.

References Cited
UNITED STATES PATENTS

| | | | |
|---|---|---|---|
| 2,397,933 | 4/1946 | Fowle et al. | 318—162 X |
| 2,424,193 | 7/1947 | Rost et al. | 343—7 |
| 2,462,925 | 3/1949 | Varian | 318—19 |
| 2,489,305 | 11/1949 | McLennan | 318—162 X |
| 2,522,851 | 9/1950 | Tyrner | 318—162 |
| 2,582,588 | 1/1952 | Fennessy et al. | |
| 2,586,743 | 2/1952 | Thresher et al. | 343—10 |
| 2,637,848 | 5/1953 | Cunningham | 343—112 |
| 2,526,682 | 10/1950 | Mulberger | 343—9 |

BENJAMIN A. BORCHELT, *Primary Examiner.*

NORMAN H. EVANS, *Examiner.*

B. L. PROUTY, A. K. GEER, J. W. GALLAGHER, V. R. PENDEGRASS, *Assistant Examiners.*